US010757918B2

(12) United States Patent
Stoccardo

(10) Patent No.: US 10,757,918 B2
(45) Date of Patent: Sep. 1, 2020

(54) TOUCHLESS PET WASTE CONTAINER

(71) Applicant: David William Stoccardo, Bradenton, FL (US)

(72) Inventor: David William Stoccardo, Bradenton, FL (US)

( * ) Notice: Subject to any disclaimer, the term of this patent is extended or adjusted under 35 U.S.C. 154(b) by 401 days.

(21) Appl. No.: 15/880,296

(22) Filed: Jan. 25, 2018

(65) Prior Publication Data

US 2018/0206453 A1 Jul. 26, 2018

Related U.S. Application Data

(60) Provisional application No. 62/450,194, filed on Jan. 25, 2017.

(51) Int. Cl.
*A01K 23/00* (2006.01)
(52) U.S. Cl.
CPC .................... *A01K 23/00* (2013.01)
(58) Field of Classification Search
CPC ....................................................... A01K 23/00
USPC ........................................................... 119/868
See application file for complete search history.

(56) References Cited

U.S. PATENT DOCUMENTS

| 1,175,773 | A | * | 3/1916 | Khoubesserian | ...... | A01K 23/00 119/868 |
| 2,585,251 | A | * | 2/1952 | Kahlert | .................. | A01K 23/00 119/868 |
| 4,444,152 | A | * | 4/1984 | Berardo | .................. | A01K 23/00 119/868 |
| 4,969,419 | A | * | 11/1990 | Fong | ...................... | A01K 23/00 119/868 |
| 5,355,836 | A | * | 10/1994 | Vallery | .................. | A01K 23/00 119/868 |
| 5,819,691 | A | * | 10/1998 | Lavi | ...................... | A01K 23/00 119/868 |
| 8,893,664 | B2 | * | 11/2014 | Blanco | .................. | A01K 23/00 119/867 |
| 9,332,732 | B2 | | 5/2016 | Stoccardo | | |
| 2004/0144334 | A1 | * | 7/2004 | Berardo | ................. | A01K 23/00 119/868 |

(Continued)

FOREIGN PATENT DOCUMENTS

| DE | 10315952 | A1 | * | 10/2004 | ............. | A01K 23/00 |
| DE | 202015004315 | U1 | * | 7/2015 | ........... | A61B 10/007 |

(Continued)

*Primary Examiner* — Son T Nguyen

(57) ABSTRACT

A pet waste container that attaches to the animal and does not require direct contact with waste for removal and disposal. The container includes a disposable waste bag, a tail drawstring, a hind leg cord, and an elastic support cord. The disposable waste bag collects waste material from the animal. The tail drawstring is looped and slidably attached about a main opening of the disposable waste bag and attaches around the animal's tail and lower back portion. The hind leg cord is positioned parallel and offset to the tail drawstring and is attached to the disposable waste bag. The hind leg cord secures about either hind leg of the animal. The elastic support cord ensures the disposable waste bag remains adequately positioned next to the animal's rear end throughout various movements. The elastic support cord is attached to the disposable waste bag and is connected to the hind leg cord.

7 Claims, 4 Drawing Sheets

(56) References Cited

U.S. PATENT DOCUMENTS

| | | | | |
|---|---|---|---|---|
| 2005/0022753 A1* | 2/2005 | Nakamura | ............ | A01K 23/00 |
| | | | | 119/868 |
| 2005/0224015 A1* | 10/2005 | Gamache | ............... | A01K 23/00 |
| | | | | 119/868 |
| 2007/0284898 A1* | 12/2007 | Miroe | .................... | A01K 23/00 |
| | | | | 294/1.5 |
| 2014/0238315 A1* | 8/2014 | Lee | ........................ | A01K 23/00 |
| | | | | 119/868 |
| 2015/0034023 A1* | 2/2015 | Tseng | ..................... | A01K 23/00 |
| | | | | 119/868 |
| 2015/0189859 A1* | 7/2015 | John | ..................... | A01K 23/00 |
| | | | | 119/868 |

FOREIGN PATENT DOCUMENTS

| | | | | |
|---|---|---|---|---|
| JP | 2014090719 A * | 5/2014 | ............. | A01K 23/00 |
| WO | WO-2008037824 A1 * | 4/2008 | ............. | A01K 23/00 |
| WO | WO-2010044547 A2 * | 4/2010 | ............. | A01K 23/00 |

* cited by examiner

TOUCHLESS PET WASTE CONTAINER

The current application claims a priority to the U.S. Provisional Patent application Ser. No. 62/450,194, filed on Jan. 25, 2017.

FIELD OF THE INVENTION

The present invention relates generally to pet accessories. More specifically, the present invention is a touchless pet waste container which allows a user to collect and dispose of waste from a pet without direct contact.

BACKGROUND OF THE INVENTION

Dogs are popular pets in the United States and across the world, with many persons having one or more dogs. While dog ownership has many positives, there are responsibilities as well. One of these responsibilities includes the collection of dog waste and poop, a hassle for many dog owners. Currently there are numerous methods in which dog waste is collected, with solutions ranging from simple to complicated. Many people use basic methods, such as a plastic bag, or sometimes a dedicated disposable scooper, to pick up their pet's waste. While this method is simple, it can prove difficult for people with injuries or limited range of motion. Others still find the entire process to be too much of a bother and leave their pet's waste to sit, regardless of any local regulations.

To address the above drawbacks, there have been some inventions that utilize a strap system to secure a waste receptacle to the rear of the dog. The idea behind these inventions is to make the poop collection process easier; with a strap system, a person does not need to actively collect pet waste, but rather can passively allow waste to accumulate in a container and dispose of the waste filled container after the dog has defecated. However, these strap systems still require a person to directly interact with the waste receptacle. While certainly a step up from the basic plastic bag, many are adverse to the direct handling of waste material, and will shy away from the above strap systems. While having a bag positioned to catch waste is desirable, having to remove and manipulate said bag is unappealing, especially when the bag may have been dirtied due to the elements or even a diarrheic episode.

It is therefore an object of the present invention to provide a method for receiving waste from a pet such as a dog. It is a further object of the present invention to provide a waste receiving system that can be operated indirectly, without the need for personal handling of the waste container.

DETAIL DESCRIPTIONS OF THE INVENTION

All illustrations of the drawings are for the purpose of describing selected versions of the present invention and are not intended to limit the scope of the present invention.

The present invention provides a touchless pet waste container. The present invention easily attaches to a pet's rear end and directly collects excrements. In this manner, animal waste such as that from dogs can be dealt without requiring direct contact. Additionally, the removal process for the present invention seals the animal waste within, thus preventing direct contact to the user. The present invention is provided primarily for use with dogs, but can ultimately be utilized and adapted for any quadruped or even biped.

Figure 1:
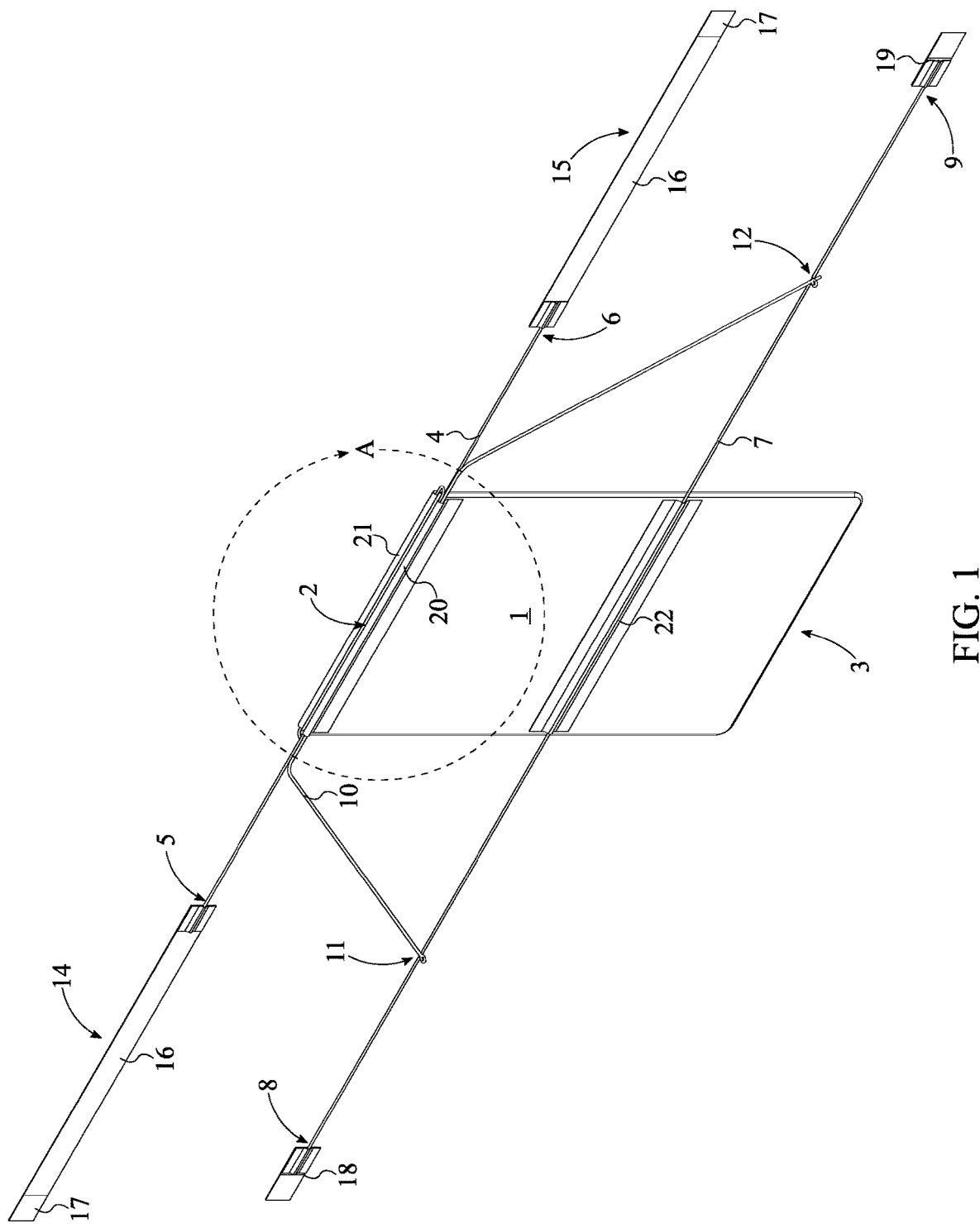
FIG. 1 is a perspective view of the present invention.
Figure 2:
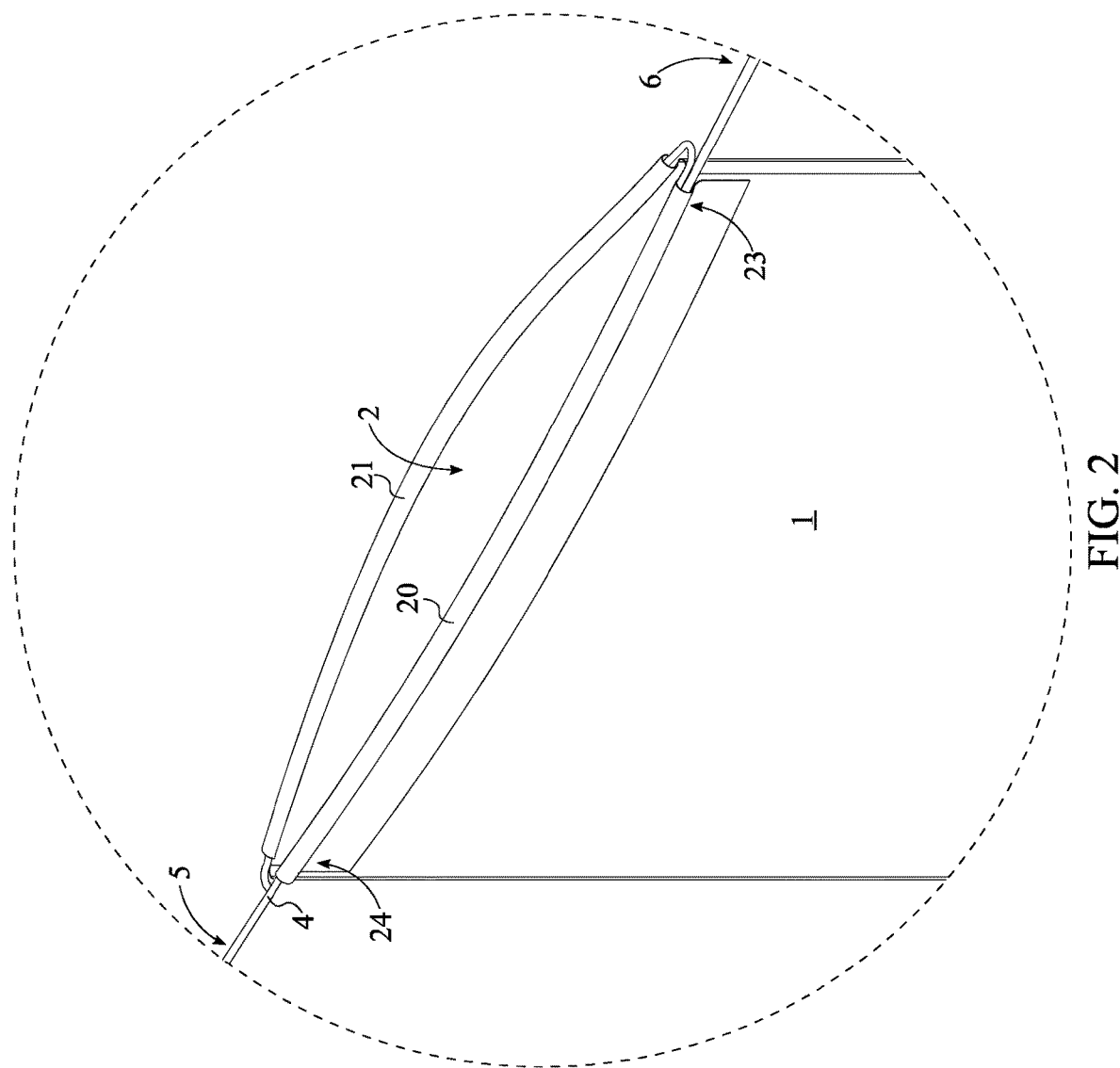
FIG. 2 is a detailed view taken about circle A-A in FIG. 1 wherein the elastic support cord is omitted.
Figure 4:
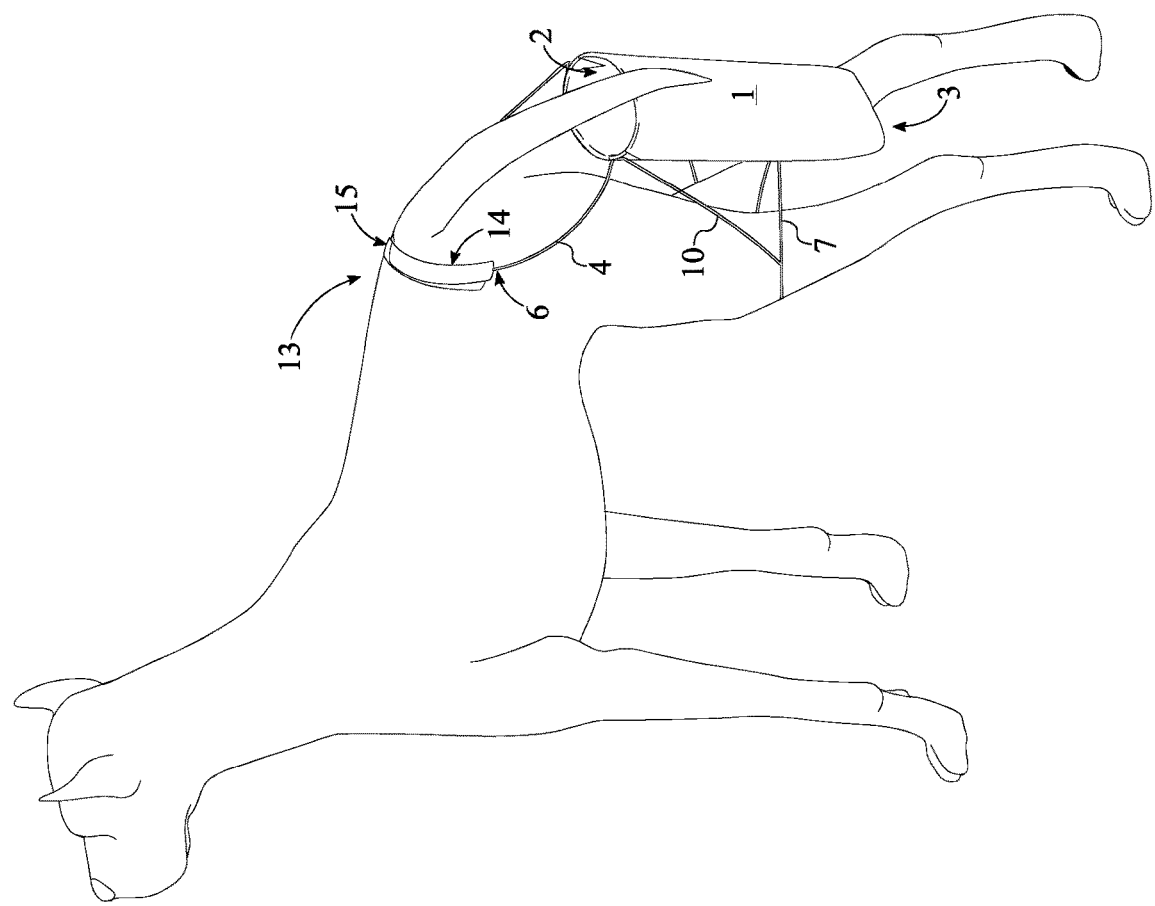
FIG. 4 is a rear perspective view of the present invention in a functional configuration, i.e. attached to an animal.

Referring to FIG. 1, in the simplest embodiment, the present invention comprises a disposable waste bag 1, a tail drawstring 4, a hind leg cord 7, and an elastic support cord 10. The disposable waste bag 1 is a non-rigid container which acts as the waste receptacle to receive and store animal waste. When attached to the animal, the disposable waste bag 1 is oriented with a main opening 2 of the disposable waste bag 1 being positioned directly next to the animal's rectal area. Resultantly, waste produced by the animal is automatically collected within the disposable waste bag 1. The size, material, design, color, and other similar characteristics of the disposable waste bag 1 are subject to change to meet the needs for a specific animal. The disposable waste bag 1 is securely attached to the animal by the tail drawstring 4 and the hind leg cord 7 as the animal goes through a wide range of motions. The tail drawstring 4 supports the disposable waste bag 1 from the main opening 2 region. Additionally, the tail drawstring 4 controls the open and closes state of the main opening 2, similar to traditional drawstring bags. More specifically, the tail drawstring 4 is looped about the main opening 2 of the disposable waste bag 1 as seen in FIG. 2. Additionally, the tail drawstring 4 is laterally and slidably attached to the disposable waste bag 1 about the main opening 2. Resultantly, any tension on the tail drawstring 4 will constrict the body of the tail drawstring 4 into a smaller loop, thus cause the main opening 2 to constrict as well. In relation to the animal, the tail drawstring 4 wraps around and attaches to the animal's tail as seen in FIG. 4. The hind leg cord 7 is positioned adjacent to the thighs of the animal and wraps around each of the hind legs to support a bottom end 3 of the disposable waste bag 1. In reference to the disposable waste bag 1, the hind leg cord 7 is positioned parallel and offset to the tail drawstring 4, along the disposable waste bag 1. The tail drawstring 4 is centrally attached to the disposable waste bag 1, adjacent to the main opening 2. Preferably, the hind leg cord 7 is attached to the disposable waste bag 1, adjacent to the bottom end 3 in order to support the body of the disposable waste bag 1.

Referring to FIG. 4, the elastic support cord 10 ties provides lateral support to the disposable waste bag 1 and keeps the disposable waste bag 1 from laterally translating. More specifically, the elastic support cord 10 is an elongated and flexible string, cord, lace, or rope. The elastic support cord 10 is centrally attached to the disposable waste bag 1, adjacent to the main opening 2. Additionally, the elastic support cord 10 extends towards the bottom end 3 of the disposable waste bag 1 and is attached to the hind leg cord 7 at two points. A first end 11 of the elastic support cord 10 is attached to the hind leg cord 7, adjacent to a first end 8 of the hind leg cord 7. Similarly, a second end 12 of the elastic support cord 10 is attached to the hind leg cord 7, adjacent to a second end 9 of the hind leg cord 7. In one embodiment of the present invention, the elastic support cord 10 is also laterally connected to the tail drawstring 4.

The general process for utilizing the present invention first includes positioning the disposable waste bag 1 adjacent to the rear of the animal with the main opening 2 being oriented directly underneath the animal's tail. The tail drawstring 4 is then wrapped around the animal's tail and secured to atop of the animal's back through a first fastening mechanism 13. Next, the first end 8 of the hind leg cord 7 is wrapped around one of the animal's hind legs and secured in place through a second fastening mechanism 18. Similarly, and finally, the second end 9 of the hind leg cord 7 is wrapped around the other of the animal's hind legs and secured in place through a third fastening mechanism 19. As the tail drawstring 4 is wrapped around the animal's tail, the tail drawstring 4 constricts and forms the main opening 2 into a semi-circular shape; initially the disposable waste bag 1 is stored and sold in a flat-like shape. Once the disposable waste bag 1 is filled with waste or the user decides to take off the present invention, the user simply pulls on the tail drawstring 4 to fully constrict and close the main opening 2. Simultaneously, this motion releases the first fastening mechanism 13. Afterwards, any minor pulling force on the hind leg cord 7, the tail drawstring 4, or the elastic support cord 10 will disengage the second fastening mechanism 18 and the third fastening mechanism 19, thus releasing the present invention from the animal. Alternatively, the user may individually release the first fastening mechanism 13, the second fastening mechanism 18, and the third fastening mechanism 19.

Referring to FIG. 1 and FIG. 4, the first fastening mechanism 13 is integrated/connected to the tail drawstring 4 to secure the tail drawstring 4 about the top rear portion of the animal, the tail. The first fastening mechanism 13 comprises a first engaging element 14 and a second engaging element 15. The first engaging element 14 is adjacently connected to a first end 5 of the tail drawstring 4. Similarly, the second engaging element 15 is adjacently connected to a second end 6 of the tail drawstring 4. The first engaging element 14 and the second engaging element 15 are designed to removably interlock, attach, or adhere to each other. For this, a variety of methods and fasteners may be used as the first engaging element 14 and the second engaging element 15 including but not limited to adhesive strips hook-and-loop fasteners, buttons, and interlocking hooks. As described above, when the present invention is configured into a functional configuration, i.e. attached to the animal, the main opening 2 of the disposable waste bag 1 is positioned directly underneath the tail. To support and hold the disposable waste bag 1 in the position, the first end 5 of the tail drawstring 4 and the second end 6 of the tail drawstring 4 are wrapped around the tail of the animal and positioned adjacent to each other on top of the animal's back. The tail drawstring 4 is secured in place with the first engaging element 14 being attached to the second engaging element 15.

Referring to FIG. 1, in the preferred embodiment of the present invention, the first engaging element 14 and the second engaging element 15 each comprise an elongated tab 16 and an adhesive strip 17 that allow for quick attachment and release. The elongated tab 16 is a strip of thin rectangular material that attaches to the tail drawstring 4; the elongated tab 16 is preferably composed of polyester film. The adhesive strip 17 acts as the attachment element; preferably respositionable PSA micronax. The elongated tab 16 and the adhesive strip 17 allow the present invention to be easily attached and detached to the animal. The elongated tab 16 of the first engaging element 14 is terminally connected to the first end 5 of the tail drawstring 4. Similarly, the elongated tab 16 of the second engaging element 15 is terminally connected to the second end 6 of the tail drawstring 4. For both, the first end 5 of the tail drawstring 4 and the second end 6 of the tail drawstring 4, the adhesive strip 17 is laterally connected to the elongated tab 16. In particular, the adhesive strip 17 is coated onto the elongated tab 16. For securing the tail drawstring 4 to the animal, the adhesive strip 17 of the first engaging element 14 is adhered to the elongated tab 16 of the second engaging element 15 through the application of a gentle force. Similarly, the adhesive strip 17 of the second engaging element 15 is adhered to the elongated tab 16 of the first engaging element 14. To release the first fastening mechanism 13, a small pulling force is applied to tail drawstring 4 to release the first engaging element 14 from the second engaging element 15.

Through the second fastening mechanism 18 and the third fastening mechanism 19, the hind leg cord 7 is secured to the legs of the animal. The second fastening mechanism 18 is connected to the first end 8 of the hind leg cord 7. Similarly, the third fastening mechanism 19 is connected to the second end 9 of the hind leg cord 7. When the present invention is configured into the functional configuration, the first end 8 of the hind leg cord 7 is attached to the disposable waste bag 1 by the second fastening mechanism 18, thus creating a loop for one hind leg of the animal. Similarly, the second end 9 of the hind leg cord 7 is attached to the disposable waste bag 1 by the third fastening mechanism 19 to create a loop for the other hind leg of the animal. In the preferred embodiment of the present invention, the second fastening mechanism 18 and the third fastening mechanism 19 are each an adhesive tab. Resultantly, only a small pulling force is required to attach and release the hind leg cord 7 from the disposable waste bag 1 and thus the animal's legs.

Figure 3:
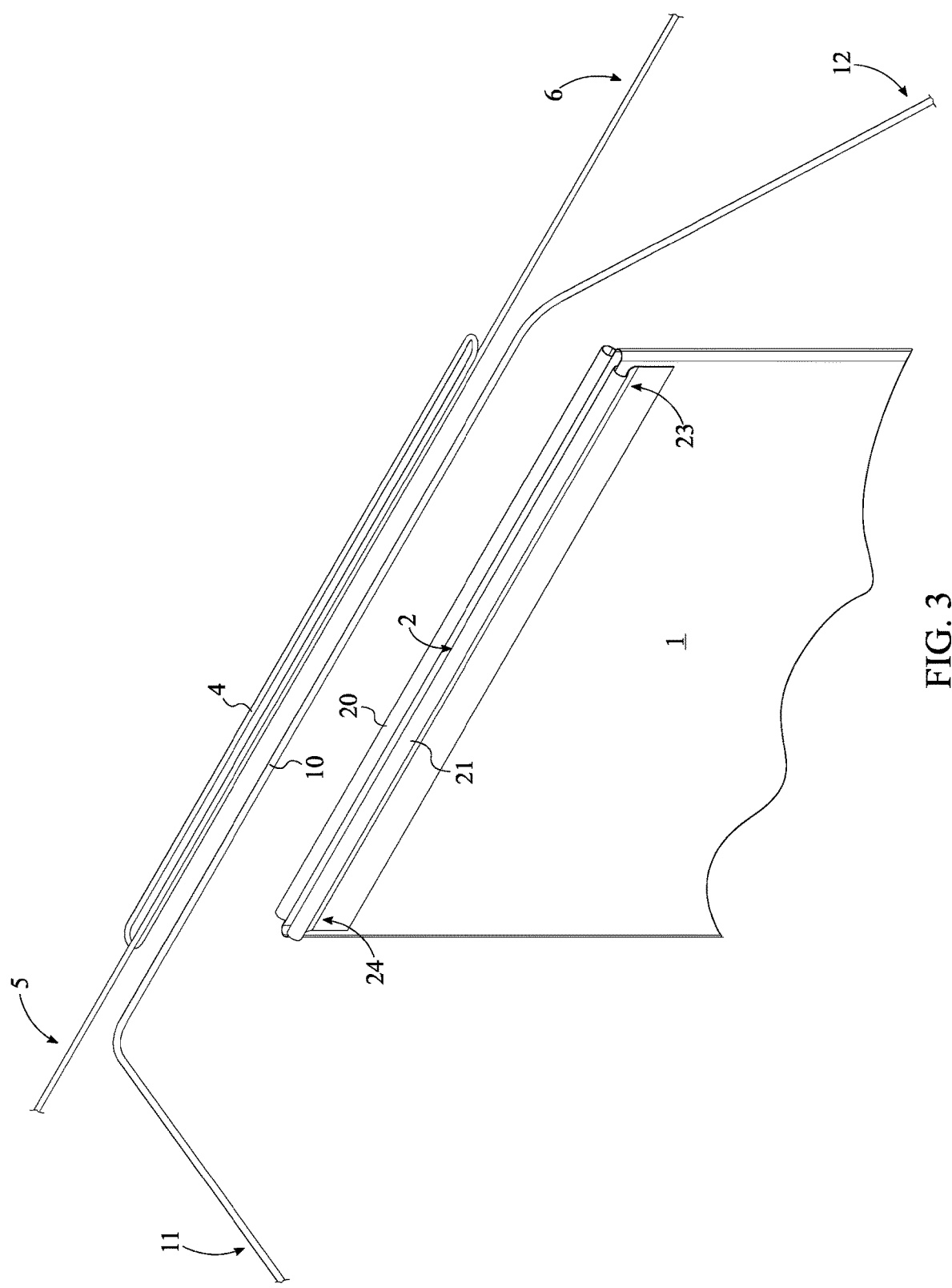
FIG. 3 is an enlarged perspective view of the present invention in an exploded state.

The tail drawstring 4 and the elastic support cord 10 are attached to the disposable waste bag 1 through a first sleeve 20 and a second sleeve 21 as seen in FIG. 3 and FIG. 4. The first sleeve 20 and the second sleeve 21 are each an elongated tubular structure composed of the same material as the disposable waste bag 1. The first sleeve 20 and the second sleeve 21 receive the elastic support cord 10 and the tail drawstring 4. The first sleeve 20 and the second sleeve 21 are radially distributed about the main opening 2 of the disposable waste bag 1. The first sleeve 20 is laterally connected to the disposable waste bag 1 along the main opening 2 of the disposable waste bag 1. Similarly, the second sleeve 21 is laterally connected to the disposable waste bag 1 along the main opening 2 of the disposable waste bag 1 such that the first sleeve 20 and the second sleeve 21 cover the entire rim of the main opening 2. The tail drawstring 4 loops through the first sleeve 20 and the second sleeve 21 such that when the elastic support cord 10 is pulled, the first sleeve 20 and the second sleeve 21 constrict, forcing the main opening 2 to constrict as well. More specifically, the tail drawstring 4 traverses through the second sleeve 21 and the first end 5 of the tail drawstring 4 traversing from a first end 23 of the first sleeve 20 to a second end 24 of the first sleeve 20. Similarly, the second end 6 of the tail drawstring 4 traverses from the second end 24 of the first sleeve 20 to the first end 23 of the first sleeve 20, thus covering the entire main opening 2. The elastic support cord 10 attaches to the disposable waste bag 1 by simply traversing through the first sleeve 20.

The hind leg cord 7 is attached to the disposable waste bag 1 through a third sleeve 22. The third sleeve 22 is an elongated tubular structure composed of the same material as the disposable waste bag 1. The third sleeve 22 is positioned adjacent to the bottom end 3 of the disposable waste bag 1 and extends across the disposable waste bag 1. Additionally, the third sleeve 22 is sized to the width of the disposable waste bag 1 and is adjacently connected to the disposable waste bag 1. The hind leg cord 7 traverses through the third sleeve 22 and allows for the disposable waste bag 1 to translate relative to the hind leg cord 7 to ensure a comfortable fit for the animal.

In the preferred embodiment, the present invention is manufactured out of biodegradable materials but is not limited to these options. Due to increasing environmental concerns, the materials used for construction should also be compostable. Recent studies have emphasized the harmful effects that conventional plastic bags have on the environment. For example, cellulose based plastics are an alternative that may be suitable for the present invention. Bioplastics can be manufactured out of renewable materials, allowing the present invention to be fully biodegradable. Furthermore, dog waste is harmful to plant matter, and unsuitable as fertilizer. Constant exposure to canine fecal matter destroys plant matter and alters the soil potential of hydrogen. The materials used in the construction of the present invention may integrate various chemical agents that neutralize the toxicity of dog waste.

Although the invention has been explained in relation to its preferred embodiment, it is to be understood that many other possible modifications and variations can be made without departing from the spirit and scope of the invention as hereinafter claimed.

What is claimed is:

1. A touchless pet waste container comprises:
   a disposable waste bag;
   a tail drawstring;
   a hind leg cord;
   an elastic support cord;
   the tail drawstring being looped about a main opening of the disposable waste bag;
   the tail drawstring being laterally and slidably attached to the disposable waste bag about the main opening;
   the hind leg cord being positioned parallel and offset to the tail drawstring, along the disposable waste bag;
   the hind leg cord being centrally attached to the disposable waste bag;
   the elastic support cord being centrally attached to the disposable waste bag, adjacent to the main opening;
   a first end of the elastic support cord being attached to the hind leg cord, adjacent to a first end of the hind leg cord; and
   a second end of the elastic support cord being attached to the hind leg cord, adjacent to a second end of the hind leg cord.

2. The touchless pet waste container as claimed in claim 1 comprises:
   a first fastening mechanism;
   wherein the first fastening mechanism and the tail drawstring are configured into a functional configuration;
   the first fastening mechanism comprises a first engaging element and a second engaging element;
   the first engaging element being adjacently connected to a first end of the tail drawstring;
   the second engaging element being adjacently connected to a second end of the tail drawstring;
   the first end of the tail drawstring being positioned adjacent to the second end of the tail drawstring;
   the first engaging element being attached to the second engaging element; and
   the tail drawstring constricting the main opening.

3. The touchless pet waste container as claimed in claim 2 comprises:
   the first engaging element and the second engaging element each comprise an elongated tab and an adhesive strip;
   the elongated tab of the first engaging element being terminally connected to the first end of the tail drawstring;
   the elongated tab of the second engaging element being terminally connected to the second end of the tail drawstring;
   the adhesive strip being laterally connected to the elongated tab;
   the adhesive strip of the first engaging element being adhered to the elongated tab of the second engaging element; and
   the adhesive strip of the second engaging element being adhered to the elongated tab of the first engaging element.

4. The touchless pet waste container as claimed in claim 1 comprises:
   a second fastening mechanism;
   a third fastening mechanism;
   wherein the second fastening mechanism, the third fastening mechanism, and the hind leg cord being configured into a functional configuration;
   the second fastening mechanism being connected to the first end of the hind leg cord;
   the third fastening mechanism being connected to the second end of the hind leg cord;
   the first end of the hind leg cord being attached to the disposable waste bag by the second fastening mechanism; and
   the second end of the hind leg cord being attached to the disposable waste bag by the third fastening mechanism.

5. The touchless pet waste container as claimed in claim 4, wherein the second fastening mechanism and the third fastening mechanism are each an adhesive tab.

6. The touchless pet waste container as claimed in claim 1 comprises:
   a first sleeve;
   a second sleeve;
   the first sleeve and the second sleeve being radially distributed about the main opening of the disposable waste bag;
   the first sleeve being laterally connected to the disposable waste bag along the main opening of the disposable waste bag;
   the second sleeve being laterally connected to the disposable waste bag along the main opening of the disposable waste bag;
   the tail drawstring traversing through the second sleeve;
   a first end of the tail drawstring traverses from a first end of the first sleeve to a second end of the first sleeve;
   a second end of the tail drawstring traverses from the second end of the first sleeve to the first end of the first sleeve; and
   the elastic support cord traversing through the first sleeve.

7. The touchless pet waste container as claimed in claim 1 comprises:
   a third sleeve;
   the third sleeve being positioned adjacent to a bottom end of the disposable waste bag;
   the third sleeve extending across the disposable waste bag;
   the third sleeve being adjacently connected to the disposable waste bag; and
   the hind leg cord traversing through the third sleeve.

* * * * *